United States Patent
Loescher et al.

(10) Patent No.: US 6,503,864 B2
(45) Date of Patent: Jan. 7, 2003

(54) PROCESS FOR SULFIDING CATALYST IN A COLUMN

(75) Inventors: Mitchell E. Loescher, Houston, TX (US); Gary G. Podrebarac, Houston, TX (US); Purvis K. Ho, Houston, TX (US)

(73) Assignee: Catalytic Distillation Technologies, Pasadema, TX (US)

( * ) Notice: Subject to any disclaimer, the term of this patent is extended or adjusted under 35 U.S.C. 154(b) by 0 days.

(21) Appl. No.: 09/779,759

(22) Filed: Feb. 8, 2001

(65) Prior Publication Data

US 2002/0132731 A1 Sep. 19, 2002

(51) Int. Cl.[7] .................... B01J 27/02; B01J 31/00; B01J 24/047; B01J 27/051; B01J 27/049
(52) U.S. Cl. .............. 502/216; 502/168; 502/219; 502/220; 502/221; 502/222; 502/223
(58) Field of Search .................. 502/168, 216, 502/219–223

(56) References Cited

U.S. PATENT DOCUMENTS

| | | | | |
|---|---|---|---|---|
| 4,719,195 A | * | 1/1988 | Toulhoat et al. ............ | 502/216 |
| 4,725,569 A | * | 2/1988 | Tuszynski et al. .......... | 502/168 |
| 4,725,571 A | * | 2/1988 | Tuszynski ................... | 502/220 |
| 5,779,883 A | | 7/1998 | Hearn et al. | |
| 5,922,638 A | * | 7/1999 | Dufresne et al. ........... | 502/216 |
| 6,059,956 A | * | 5/2000 | Dufresne .................... | 208/108 |
| 6,100,216 A | * | 8/2000 | Dufresne et al. ........... | 502/219 |
| 6,197,718 B1 | * | 3/2001 | Brignac et al. ............. | 502/216 |
| 6,325,920 B1 | * | 12/2001 | Brun et al. ............. | 208/216 R |

FOREIGN PATENT DOCUMENTS

EP          628347     * 12/1994    ............ B01J/37/20

* cited by examiner

Primary Examiner—Mark L. Bell
Assistant Examiner—Patricia L. Hailey
(74) Attorney, Agent, or Firm—Kenneth H. Johnson

(57) ABSTRACT

A process for the sulfiding of a hydrodesulfurization catalyst for example in a distillation column reactor. The catalyst in the distillation column reactor is first dried using nitrogen and the reactor is filled with a sulfiding solvent and circulation begun. The reactor is heated to a temperature above the decomposition temperature of the sulfiding agent to be used and the sulfiding agent charged to the reactor. When sulfiding agent breakthrough is noted in the overheads the temperature is raised and held until sulfiding is complete.

17 Claims, 1 Drawing Sheet

PROCESS FOR SULFIDING CATALYST IN A COLUMN

BACKGROUND OF THE INVENTION

1. Field of the Invention

The present invention relates generally to a process for the sulfiding of a hydrodesulfurization catalyst in a distillation column reactor. More particularly the invention relates to a process wherein a sulfiding agent such as $H_2S$ and a solvent are concurrently fed through a distillation column containing a hydrodesulfurization catalyst that contain hydrogenation metals in their oxide state.

2. Related Information

Hydrodesulfurization is a process for removing organic sulfur compounds from petroleum streams by converting the sulfur in the organic sulfur compounds to $H_2S$. The process necessarily incorporates hydrogenation and thus requires hydrogenation catalysts. Water is also a product of the sulfiding reaction and must be removed.

Catalysts which are useful for the hydrodesulfurization reaction include Group VIII metals such as cobalt, nickel, palladium, alone or in combination with other metals such as molybdenum or tungsten on a suitable support which may be alumina, silica-alumina, titania-zirconia or the like. Normally the metals are provided as the oxides of the metals supported on extrudates or spheres and as such are not generally useful as distillation structures.

The catalyst may also contain components from Group V, and VIB metals of the Periodic Table or mixtures thereof. The Group VIII metal provides increased overall average activity. Catalysts containing a Group VIB metal such as molybdenum and a Group VIII such as cobalt or nickel are preferred. Catalysts suitable for the hydrodesulfurization reaction include cobalt-molybdenum, nickel-molybdenum and nickel-tungsten. The metals are generally present as oxides supported on a base such as alumina, silica-alumina or the like. If the active form of the metal, the sulfide, is exposed to air, it begins to oxidize which can create a hazard.

The catalyst beds as used in the present invention may be described as fixed, meaning positioned in a fixed area of the column and include expanded beds and ebulating beds of catalyst. The catalysts in the beds may all be the same or different so long as they carry out the function of hydrogenation as described. Catalysts prepared as distillation structures are particularly useful in the present invention.

SUMMARY OF THE INVENTION

The metals contained in the hydrogenation catalysts must be converted from the stable oxide form to the reduced sulfide form to be useful for hydrodesulfurization. Because of the unique combination reactor distillation column, a unique method of reducing the oxide to the sulfide is needed. Briefly the invention is a process for sulfiding a hydrodesulfurization catalyst which comprises:

(a) drying the catalyst with nitrogen;
(b) supplying the distillation column reactor with a sulfiding solvent, preferably containing organic sulfur;
(c) establishing hydrocarbon feed and hydrogen flow rates;
(d) optionally, recycling of sulfiding solvent to supply tank;
(e) heating the distillation column reactor to a temperature above the decomposition temperature of the sulfiding agent, preferably in the range of 300–500° F.;
(f) introducing a sulfiding agent;
(g) observing breakthrough of the sulfiding agent in the overhead and increasing the temperature to a target temperature, preferably in the range of 500–700° F., upon said breakthrough; and
(h) holding the target temperature for a period of time.

After the treatment the unit may be switched to normal feed for hydrodesulfurization. The concurrent flow of the sulfiding agent and solvent is preferably upflow but could also be downflow. Hydrogen may also be fed either concurrently or countercurrently. Water by-product is removed overhead when operated in a distillation mode.

The process is preferably operated in a reactive distillation mode, although it can be operated without boiling or distillation. The term "reactive distillation" is used to describe the concurrent reaction and fractionation in a column. For the purposes of the present invention, the term "catalytic distillation" includes reactive distillation and any other process of concurrent reaction and fractional distillation in a column regardless of the designation applied thereto.

DETAILED DESCRIPTION OF THE INVENTION

The catalysts contain components from Group V, VIB, VIII metals of the Periodic Table or mixtures thereof. The Group VIII metal provides increased overall average activity. Catalysts containing a Group VIB metal such as molybdenum and a Group VIII such as cobalt or nickel are preferred. Catalysts suitable for the hydrodesulfurization reaction include cobalt-molybdenum, nickel-molybdenum and nickel-tungsten. The metals are generally present in the catalyst precursor as oxides supported on a neutral base such as alumina, silica-alumina or the like.

Figure 1:
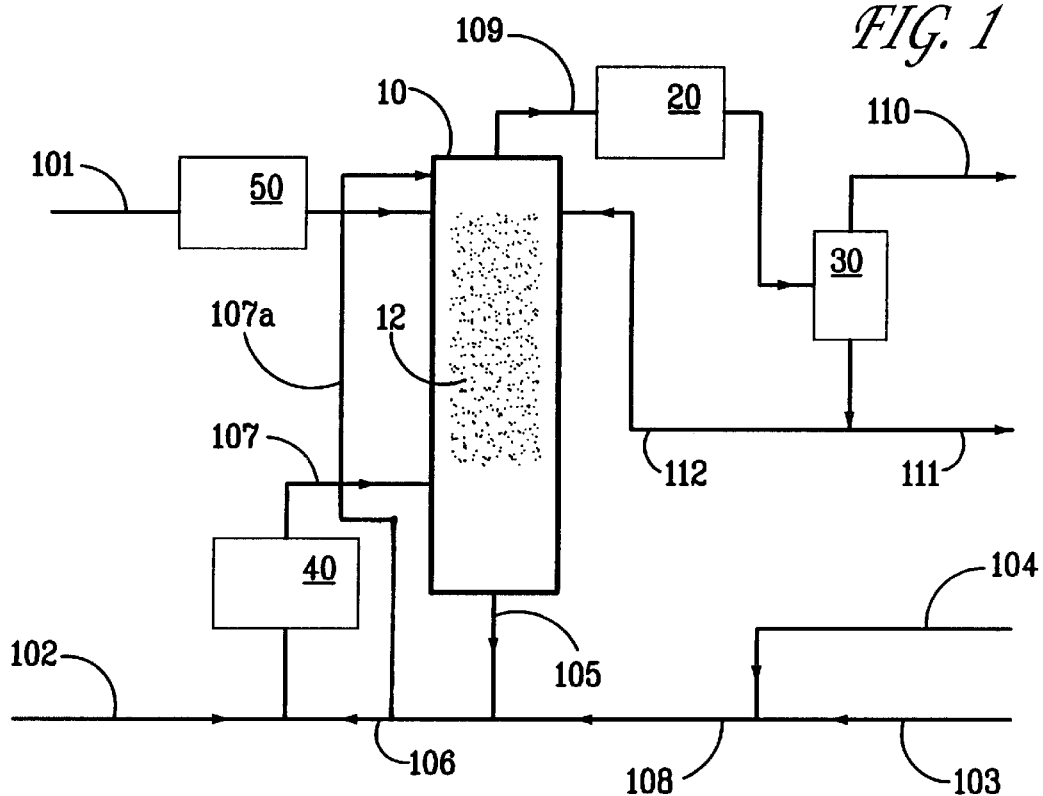
FIG. 1 is a flow diagram in schematic form of one embodiment of the invention.

Referring now to FIG. 1 there is shown a flow diagram in schematic form of one embodiment of the invention. A distillation column reactor 10 is provided having a bed 12 of hydrodesulfurization catalyst in a distillation reaction zone. In this embodiment the catalyst is prepared as a distillation structure.

Feed to the distillation column reactor 10 is via flow line 101 through feed heater 50. A sulfiding solvent is fed via flow line 103 and sulfiding agent via flow line 104. The sulfiding solvent and sulfiding agent are combined in flow line 108 and fed along with bottoms in flow line 105 to reboiler via flow line 106. Hydrogen is fed to the reboiler via flow line 102. All of the material is heated in reboiler 40 and fed to distillation column reactor 10 via flow line 107. Overheads are taken via flow line 109 and passed through partial condenser 20 with the condensible material collected and separated from the gaseous material in separator/receiver 30. The vapors are vented via flow line 110. The condensed material is removed and may be removed via flow line 111 or returned to the distillation column reactor 10 as reflux via flow line 112.

In a preferred embodiment the solvent is a heavy hydrocarbon stream which has very low olefin (less than 1 wt %) and organic nitrogen content (less than 100wppm). A highly hydrotreated jet fuel, diesel fuel, or kerosene would be suitable. The pressure in the column is set at or above the vapor pressure of the solvent at 450° F. and the solvent is heated to between 400 and 450° F. in the reboiler 40. At this point liquid from the bottoms (from line 108) is pumped to the top of the column via flow line 107a. If the solvent is boiling and overheads are being taken then the reflux in flow line 112 may be substituted for the pumped liquid in flow line 107a. In either case it is important that there is liquid flowing over the catalyst during the sulfiding step. The liquid which flows over the catalyst helps to heat up the catalyst to the desired sulfiding temperature and absorb the heat released by the sulfiding process. In this way temperature excursions during sulfiding are avoided. In this particular embodiment the column is not liquid filled but operated with a continuous vapor phase like a typical distillation column. Gas and liquid are flowing counter currently in the column.

The sulfiding agent and hydrogen are injected into the reboiler where the reaction takes place to generate $H_2S$. The flow rate of hydrogen and sulfiding agent are set such that a molar ratio $H_2S:H_2$ is between 1:25 and 1:5 is obtained following the reaction. Typically a ratio of 1:9 is preferred.

The hydrogen and $H_2S$, along with vaporized hydrocarbons passes upward through the catalyst bed where sulfiding takes place. The vent gas is monitored to measure the $H_2S$ concentration. Once the $H_2S$ is measured at its full concentration based upon that being produced in the reboiler, the temperature is the column is raised to 600° F. or higher as required. This is achieved by increasing the reboiler duty and/or raising the operating pressure. Once 600° F. is reached throughout the entire column the vent gas is once again monitored for $H_2S$. Once the final breakthrough is confirmed at 600° F. the column may be cooled down to await startup, or the feed can be brought in and the unit can be started up directly.

Figure 2:
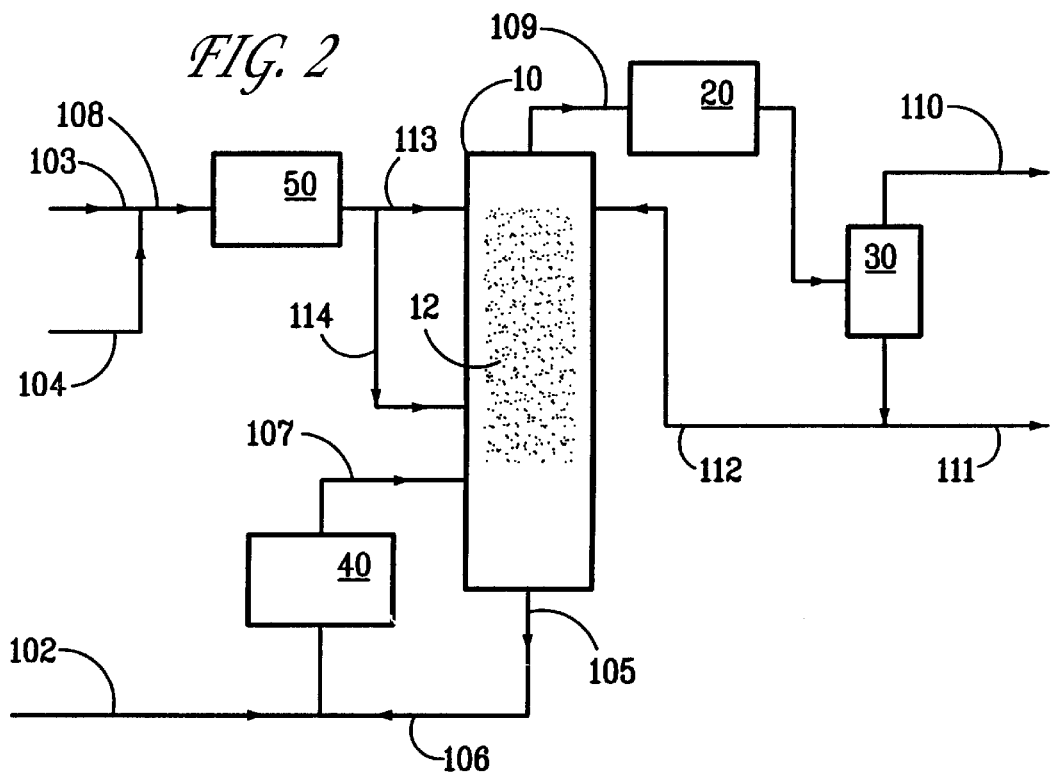
FIG. 2 is a flow diagram in schematic form of a second embodiment of the invention.

Referring now to FIG. 2 a second embodiment is shown for use when the reboiler 40 does not have sufficient capacity to supply the heat necessary. The hydrogen is fed through the reboiler 40 as in the first embodiment. However the sulfiding solvent in flow line 103 and sulfiding agent in flow line 104 are fed through the feed heater 50. After heating the solvent and agent may be fed at the top of the column via line 113 or near the bottom via line 114.

A common sulfiding agent is $H_2S$ because it is readily available in most refineries. Preferred sulfiding agents include tertiary nonyl poly sulfide (TNPS) and dimethyl disulfide, because they are available as liquids and their use facilitates exact control of the amount of sulfur in the column at one time. Another useful sulfiding agent is carbon disulfide. A suitable sulfiding agent is any organic or inorganic sulfur compound that will decompose under the conditions of treatment to convert the catalyst to a sulfide. The solvent can be chosen from any stream that will boil at the pressure in the reactor, preferably a highly hydrotreated jet fuel, naphtha, kerosene or diesel. The presence of organic sulfur compounds in the solvent is believed to provide an additional source of sulfiding agent.

The target temperatures and times depend on the type of catalyst, especially the metals composition and support to obtain the optimum degree of sulfiding for use of the catalyst in hydrodesulfurization processes. Generally the catalyst manufacturer provides the optimum sulfiding conditions.

EXAMPLE

A load of Co/Mo desulfurization catalyst was sulfided using a synthetic jet fuel with the a 5 vol % boiling point of 317° F., a 50 vol % boiling point of 421° F. and a 95 vol % boiling point of 581° F. The olefin content of the jet fuel was very low (bromine number <0.2) and the nitrogen content was 1.07 mg/liter and the sulfur content was 235 mg/liter. The low temperature sulfiding was completed at 450° F. and 65 psig. The pressure was then raised to 220 psig for the 600° F. sulfiding. The final catalyst was then tested for the desulfurization of gasoline where its usefulness was confirmed.

The invention claimed is:

1. A process for the sulfiding of a hydrodesulfurization catalyst in a distillation column reactor comprising the steps of:
   (a) drying the catalyst with an inert gas;
   (b) filling the distillation column reactor with a sulfiding solvent containing sulfur;
   (c) establishing hydrocarbon feed and hydrogen flow rates;
   (d) begin recycling of sulfiding solvent;
   (e) heating the distillation column reactor to a temperature above the decomposition temperature of the sulfiding agent;
   (f) introducing a sulfiding agent;
   (g) observing the water by-product azeotrope overhead and collecting the water;
   (h) observing said sulfiding agent breakthrough in the overhead;
   (i) increasing temperature to a second temperature; and
   (j) holding said second temperature for a period of time.

2. The process according to claim 1 wherein said sulfiding agent comprises tertiary nonyl poly sulfide.

3. The process according to claim 1 wherein said sulfiding agent comprises dimethyl disulfide.

4. The process according to claim 1 wherein the solvent is moving upflow through said catalyst.

5. The process according to claim 1 wherein the solvent is moving downflow through said catalyst.

6. The process according to claim 1 wherein the sulfiding agent and solvent are co-currently fed.

7. The process according to claim 1 wherein the sulfiding is carried out at a pressure that it is above the vapor pressure of the solvent at the first temperature.

8. The process according to claim 1 wherein the first temperature is in the range between 300 and 500° F.

9. The process according to claim 1 wherein the second temperature is in the range between 500–700° F.

10. The process according to claim 1 wherein said sulfiding agent comprises $H_2S$.

11. The process according to claim 10 wherein said catalyst comprises components selected from the group consisting of Group V, VIB and VIII metals of the Periodic Table.

12. The process according to claim 11 wherein said catalyst comprises an oxide of said components selected from the group consisting of Group V, VIB and VIII metals of the Periodic Table.

13. The process according to claim 1 wherein said solvent comprises a sulfur containing naphtha stream.

14. The process according to claim 13 wherein the sulfiding solvent and sulfiding agent are fed downflow.

15. The process according to claim 11 wherein the sulfiding solvent and sulfiding agent are fed downflow.

16. The process according to claim 1 wherein heating of step (e) is obtained by heating a bottom portion in the column.

17. The process according to claim 16 wherein the reboiler is operated at a temperature sufficient to dissociate the sulfiding agent into its constituent elements.

* * * * *